US012640466B2

(12) United States Patent
Perminjat et al.

(10) Patent No.: US 12,640,466 B2
(45) Date of Patent: May 26, 2026

(54) ELECTRONIC DEVICE INTEGRATING AN ANTENNA AND METHOD OF FABRICATING SUCH A DEVICE

(71) Applicant: STMicroelectronics (Grenoble 2) SAS, Grenoble (FR)

(72) Inventors: Florian Perminjat, Saint Romans (FR); Karine Saxod, Porte de Savoie (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 463 days.

(21) Appl. No.: 18/205,729

(22) Filed: Jun. 5, 2023

(65) Prior Publication Data

US 2023/0402745 A1 Dec. 14, 2023

(30) Foreign Application Priority Data

Jun. 9, 2022 (FR) ....................................... 2205570

(51) Int. Cl.
*H01Q 1/38* (2006.01)
*H01Q 1/36* (2006.01)
*H01Q 21/06* (2006.01)

(52) U.S. Cl.
CPC ............... *H01Q 1/38* (2013.01); *H01Q 1/364* (2013.01); *H01Q 21/061* (2013.01)

(58) Field of Classification Search
None
See application file for complete search history.

(56) References Cited

U.S. PATENT DOCUMENTS 6,567,049 B1 5/2003 Huang et al.
6,946,997 B2 9/2005 Yuanzhu
2003/0136503 A1* 7/2003 Green .............. G06K 19/07779 156/264
2011/0122045 A1 5/2011 Seo et al.
2014/0354486 A1 12/2014 Flores-Cuadras et al.

FOREIGN PATENT DOCUMENTS

JP 2001345621 A 12/2001
JP 2015103709 A * 6/2015

OTHER PUBLICATIONS

INPI Search Report and Written Opinion for priority application, FR 2205570, report dated Jan. 25, 2023, 9 pgs.

* cited by examiner

*Primary Examiner* — Crystal L Hammond
(74) *Attorney, Agent, or Firm* — Crowe & Dunlevy LLC

(57) ABSTRACT

An electronic device integrates an antenna. To fabricate such an electronic device, first antenna elements are formed on a first surface of a first substrate. The first substrate is then diced to form antenna chips. Each antenna chip includes, on a first surface corresponding to the first surface of the first substrate, one of the first antenna elements. One of the antenna chips is then bonded onto a transfer substrate. This bonding is made between a second surface of the antenna chip, orthogonal to its first surface, and an upper surface of the transfer substrate.

27 Claims, 7 Drawing Sheets

ELECTRONIC DEVICE INTEGRATING AN ANTENNA AND METHOD OF FABRICATING SUCH A DEVICE

PRIORITY CLAIM

This application claims the priority benefit of French Application for Patent No. 2205570, filed on Jun. 9, 2022, the content of which is hereby incorporated by reference in its entirety to the maximum extent allowable by law.

TECHNICAL FIELD

The present disclosure generally concerns electronic devices electronic devices comprising one or a plurality of radio frequency (RF) signal transmit and/or receive antennas. It more particularly applies to device comprising one or a plurality of RF signal transmit and/or receive antennas integrated in a package of the device.

BACKGROUND

Many electronic devices, particularly mobile telephony terminals, connected objects, etc., comprise one or a plurality of RF signal transmit and/or receive antennas integrated in a package of the device, to enable to the device to communicate at a distance and wireless, by radio waves, with one or a plurality of external devices.

It would be desirable to at least partly improve certain disadvantages of known electronic devices integrating antennas, and their manufacturing methods.

SUMMARY

For this purpose, an embodiment provides a method of manufacturing an electronic device comprising the following successive steps: a) forming a plurality of antenna elements on a first surface of a first substrate; b) dicing the first substrate to form a plurality of antenna chips, each antenna chip comprising, on a first surface corresponding to said first surface of the first substrate, one of said first antenna elements; and c) bonding one of said antenna chips onto a transfer substrate, by a second surface of the antenna chip, orthogonal to its first surface.

According to an embodiment, a first metal track is formed inside and/or on top of the transfer substrate, and the method comprises, after step c), a step of forming a second conductive track on the transfer substrate between the first antenna element and the first metal track, to electrically connect them.

According to an embodiment, the method comprises a step of depositing a first solder joint between the first antenna element and the second conductive track.

According to an embodiment, the first antenna elements are formed by depositing an electrically-conductive material over the entire first surface of the first substrate, followed by locally removing said material to define the first antenna elements.

According to an embodiment, the first antenna elements are formed by locally depositing an electrically-conductive material, for example, a conductive ink, on the first surface of the first substrate.

According to an embodiment, the method comprises, after step b), a step of forming a second antenna element on a third surface of the antenna chip, opposite to the second surface of the antenna chip.

According to an embodiment, the second antenna element is formed by locally depositing an electrically-conductive material, for example, a conductive ink, onto the third surface of the antenna chip.

According to an embodiment, the method comprises a step of depositing a second solder joint between the second and first antenna elements.

According to an embodiment, the method comprises between steps a) and b), a step of flipping the first substrate and forming a plurality of third antenna elements on a fourth surface of the first substrate, opposite to the first surface.

According to an embodiment, the first substrate is made of a semiconductor material.

According to an embodiment, the first substrate is made of glass.

According to an embodiment, the antenna chip comprises an empty or gas-filled cavity.

According to an embodiment, the antenna chip comprises two first substrates placed against each other, at least one of the two first substrates comprising a recess defining said cavity.

According to an embodiment, the first substrate is coated, during a step preceding step a), with a protection layer, at the interface with the first antenna elements.

Another embodiment provides an electronic device comprising: a) an antenna chip formed inside and on top of a first substrate, said antenna chip comprising at least one first antenna element formed on a first surface of the antenna chip; and b) a transfer substrate, wherein the antenna chip is bonded to the transfer substrate by a second surface of the antenna chip, orthogonal to its first surface.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the forming (particularly the shape) and the operation of the antennas of the described devices have not been detailed. Further, the various electronic circuits of the described devices, particularly the electronic circuits for controlling (reading and/or excitation) the antennas have not been detailed. The forming or the implementation of these elements is within the abilities of those skilled in the art based on the indications of the present disclosure.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms “front”, “back”, “top”, “bottom”, “left”, “right”, etc., or to relative positional qualifiers, such as the terms “above”, “below”, “upper”, “lower”, etc., or to qualifiers of orientation, such as “horizontal”, “vertical”, etc., reference is made to the orientation shown in the figures.

Unless specified otherwise, the expressions “around”, “approximately”, “substantially” and “in the order of” signify within 10%, and preferably within 5%.

Figure 1A:
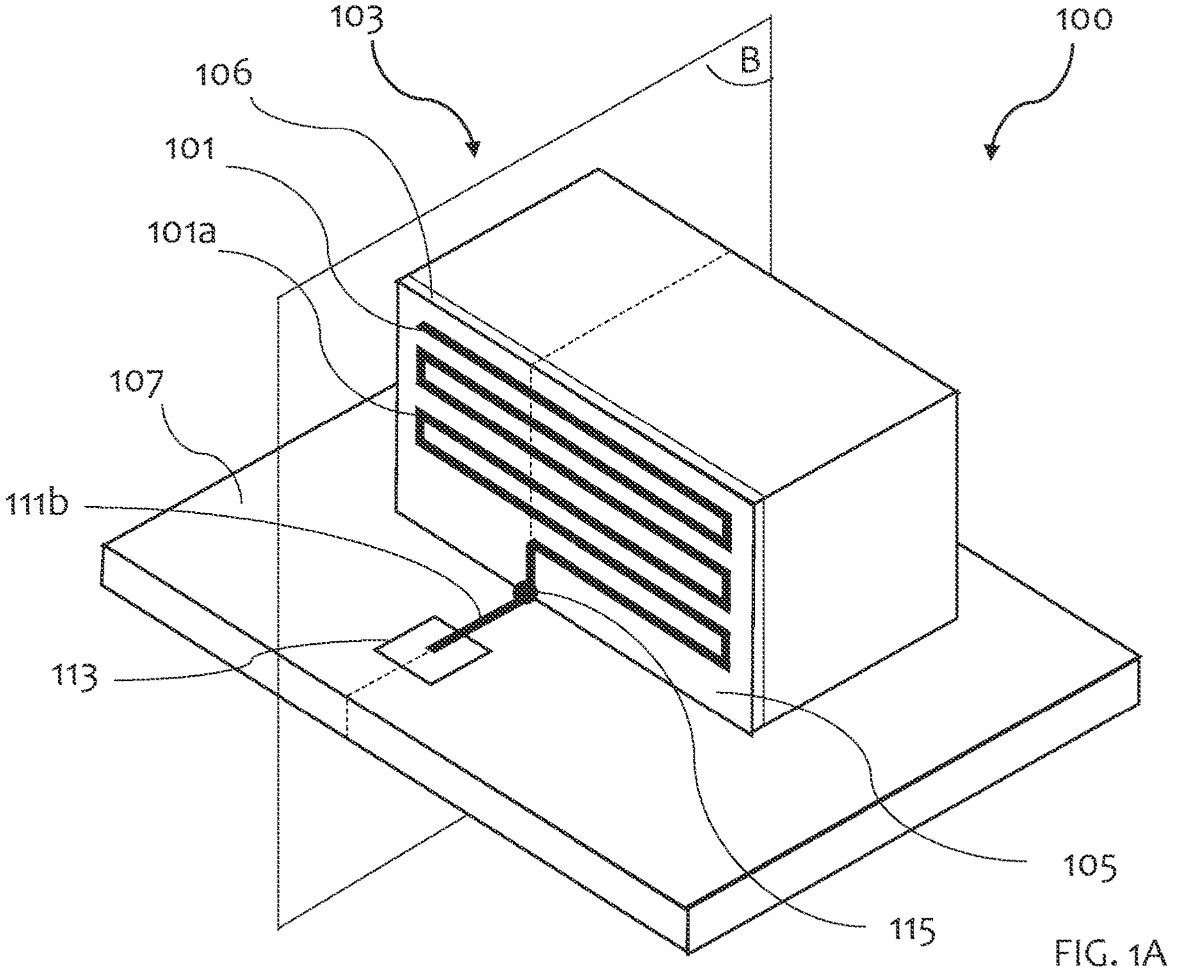
FIG. 1A and FIG. 1B respectively illustrate in a perspective view and a cross-section view, partial and simplified, an example of an electronic device comprising an antenna according to a first embodiment.
Figure 1B:
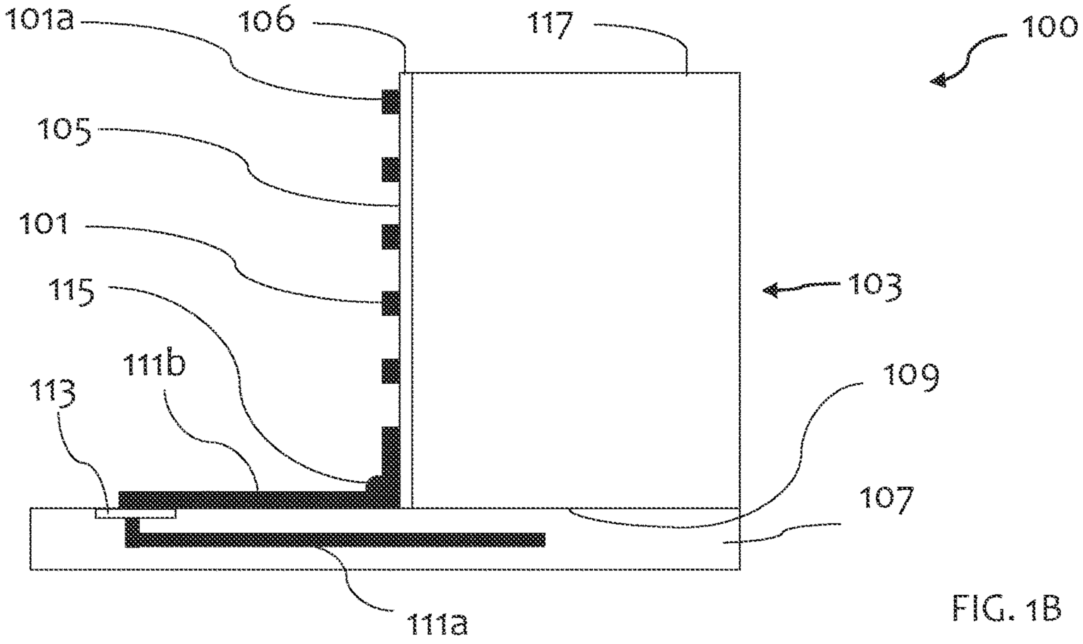

FIG. 1A and FIG. 1B respectively illustrate in a perspective view and a cross-section view, partial and simplified, an example of an electronic device 100 comprising an antenna 101 according to a first embodiment, FIG. 1B being a cross-section view along the cross-section plane B of FIG. 1A.

Antenna 101 comprises a first antenna element 101*a* formed on an antenna chip 103 and more particularly on top of and in contact with a surface 105 of antenna chip 103.

Antenna 100 is, for example, a telephone antenna configured for capturing and/or emitting electromagnetic waves and more precisely radio-frequency (RF) waves. Antenna 100 enables, for example, to establish radio communications.

As an example, antenna chip 103 comprises at the level of its surface 105, for example all over surface 105, a protection layer 106. Protection layer 106 is, for example, an electrically-insulating layer, for example made of PolyBenzlmidazole (PBI) and/or of PolyBenzOxazole (PBO).

Device 100 further comprises a transfer substrate 107 having antenna chip 103 bonded thereto. More particularly, antenna chip 103 is bonded to a connection surface of substrate 107, that is, the upper surface of substrate 107 in the orientation of the drawings, by a second surface 109 (lower surface of the chip in the orientation of the drawings) orthogonal to its first surface 105.

As an example, chip 103 has the shape of a parallelepipedal block. As an example, the first surface 105 of chip 103 has dimensions in the range from 100 μm by 100 μm to 1 mm by 1 mm, for example in the range from 200 μm by 200 μm to 800 μm by 800 μm, for example, in the order of 400 μm by 800 μm.

As an example, chip 103 comprises a substrate 117 made of a semiconductor material, for example of silicon. As a variant, chip 103 comprises a substrate made of an electrically-insulating material, for example of glass. As an example, protection layer 106 is present when the substrate of chip 103 is made of a semiconductor material. Antenna element 101*a* may then be formed on top of and in contact with the surface of protection layer 106 opposite to the chip substrate. Protection layer 106 is, for example, absent when the chip substrate is made of an electrically-insulating material. Antenna element 101*a* may then be formed on top of and in contact with the chip substrate.

Transfer substrate 107 is, for example, made of an organic material, for example a resin. As an example, transfer substrate 107 is planar.

As an example, first antenna element 101*a* comprises one or a plurality of tracks made of an electrically-conductive material, for example forming a coil, one or a plurality of spirals, or any other planar pattern suited for emitting and/or receiving radio frequency waves. As an example, first antenna element 101*a* corresponds to a coil formed by an array of parallel conductive lines coupled together by their ends. As an example, the spacing between two neighboring lines and the width of the lines are constant. The spacing between two neighboring lines is, for example, in the range from 1 μm to 500 μm, for example from 10 μm to 100 μm, for example, in the order of 45 μm. The width of the lines is, for example, in the range from 1 μm to 500 μm, for example from 5 μm to 100 μm, for example in the order of 20 μm.

In the illustrated example, antenna 101 is coupled to a first connection track 111*a* formed inside and/or on top of transfer substrate 107, for example in an interconnection array formed on the upper surface side of substrate 107. As an example, connection track 111*a* corresponds to a metal track connected, for example coupled, to an integrated circuit, not shown, for example to a processing unit, bonded and connected to transfer substrate 107.

As an example, first antenna element 101*a* is connected, for example coupled, to metal track 111*a* by a second conductive track 111*b* formed on the upper surface of transfer substrate 107. Second conductive track 111*b* is, for example, formed between first antenna element 101*a* and a connection pad 113 of transfer substrate 107, itself connected, for example, coupled, to metal track 111*a*. As an example, connection pad 113 is flush with the upper surface of transfer substrate 107. As a variant, connection pad 113 is located on top of and in contact with an upper surface of substrate 107 and, more precisely, partly on top of and in contact with connection track 111*a*.

As an example, connection pad 113 is made of a metallic material, for example copper.

As an example, antenna element 101*a* and second conductive track 111*b* are made of a same conductive material, for example, a conductive ink or any other conductive material likely to be deposited on a surface of a substrate, for example, a metallic material, for example copper or silver.

Antenna element 101*a* and second conductive track 111*b* are connected together, for example, coupled, by means of a solder joint 115. Solder joint 115 corresponds, for example, to a solder ball or to a sintering paste, or also a drop of a conductive ink. Solder joint 115 is made of a conductive material. It may be an alloy of tin (Sn), of silver (Ag), of gold (Au), of lead (Pb), of copper (Cu), of indium (In), and/or of bismuth (Bi), etc., such as SnPb, SnAgCu, SnAg, AuSn, InSn, SnBi, etc.

Thus, according to an aspect of the embodiment of FIGS. 1A and 1B, antenna chip 103 comprises an antenna element on a surface of the chip orthogonal to the connection surface of the transfer substrate, that is, a vertical surface in the orientation of the drawings. This advantageously allows a compactness gain of the device. This also enables, in certain applications, to improve the radiation pattern of the antenna and thus improve the performance of the device.

As a variant (not shown), the device of FIGS. 1A and 1B may comprise a second antenna not electrically coupled to antenna 101. In this variant, the second antenna comprises an antenna element located on the surface of chip 103 opposite to surface 105. The two antennas may be respectively connected to distinct connection pads of transfer substrate 107. The two antennas may be identical or similar, to within manufacturing dispersions, or have different patterns and/or dimensions, for example to address different frequency bands.

Figure 2A:
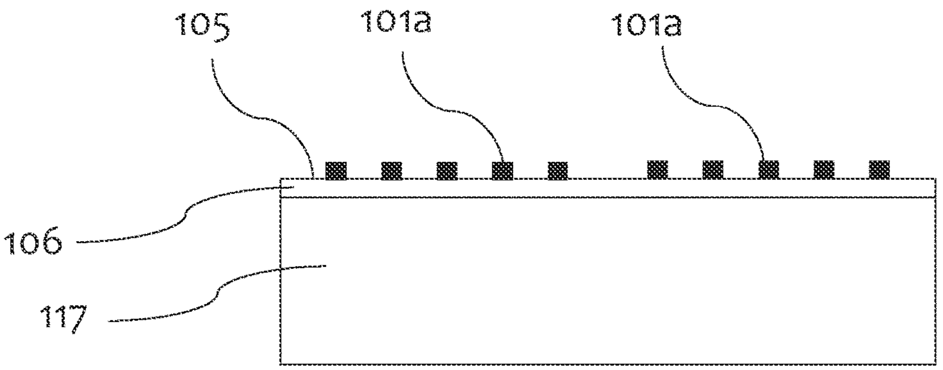
FIG. 2A and FIG. 2B are cross-section views partially and schematically illustrating successive steps of an example of a method of manufacturing the device illustrated in FIGS. 1A and 1B according to an embodiment.
Figure 2B:
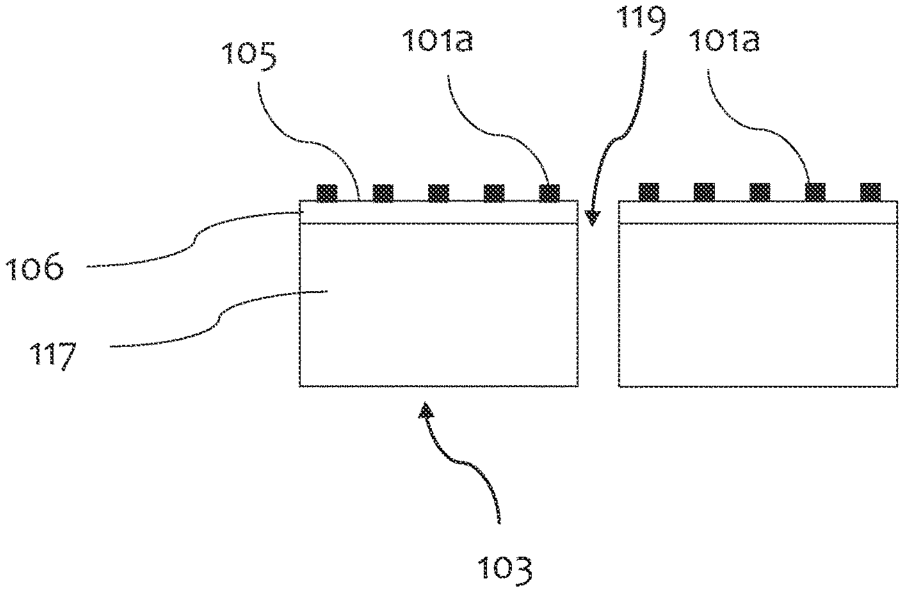

FIG. 2A and FIG. 2B are cross-section views, partially and schematically illustrating successive steps of an example of a method of manufacturing the device 100 illustrated in FIGS. 1A and 1B according to an embodiment.

FIG. 2A shows a structure comprising substrate 117 having first antenna elements 101*a* formed therein. First antenna elements 101*a* are formed on a surface of substrate 117, corresponding, at the end of the method of manufacturing device 100, to the surface 105 of chip 103. As an example, first antenna elements 101*a* are formed on top of and in contact with protection layer 106 coating substrate 117. As a variant, when protection layer 106 is omitted, first antenna elements 101*a* are formed in contact with substrate 117.

As an example, protection layer 106, when it is present, is deposited, before the step of forming of first antenna elements 101*a*, on the upper surface of substrate 117, for example in contact with the upper surface of substrate 117. Layer 106 continuously extends, for example, over the entire upper surface of substrate 117.

As an example, first antenna elements 101*a* are formed by local deposition of a conductive material, for example a conductive ink, on the upper surface of substrate 117, possibly followed by a sintering. The local deposition is, for example, implemented by inkjet printing, or by any other suitable method of local deposition of a conductive material on a substrate. As a variant, a continuous layer of a conductive material, for example, metallic, for example made of copper, is deposited over the entire upper surface of the substrate, and then locally removed, for example, by photolithography.

FIG. 2B shows a structure obtained at the end of a step of dicing of the structure illustrated in FIG. 2A to form individual chips 103. During this dicing step, trenches 119 are formed in substrate 117 and, for example through substrate 117 to entirely cross it. Trenches 119 then extend, for example, from the upper surface of substrate 117 to the lower surface of substrate 117. Trenches 119 are formed so that each chip 103 comprises at least one first antenna element 101*a*.

At the end of this step, although this is not shown, each chip 103 is transferred onto the upper surface of a transfer substrate 107, for example by use of a pick-and-place tool, so that the surface 105 supporting first antenna element 101*a* is substantially orthogonal to transfer substrate 107. As an example, chip 103 is bonded to transfer substrate 107 via an adhesive film, glue, or a solder material. As an example, second conductive track 111*b* and solder joint 115 are successively deposited after the transfer and the bonding of antenna chip 103 onto the connection surface of transfer substrate 107.

Solder joint 115 is, for example, formed by laser solder ball jetting.

Figure 3A:
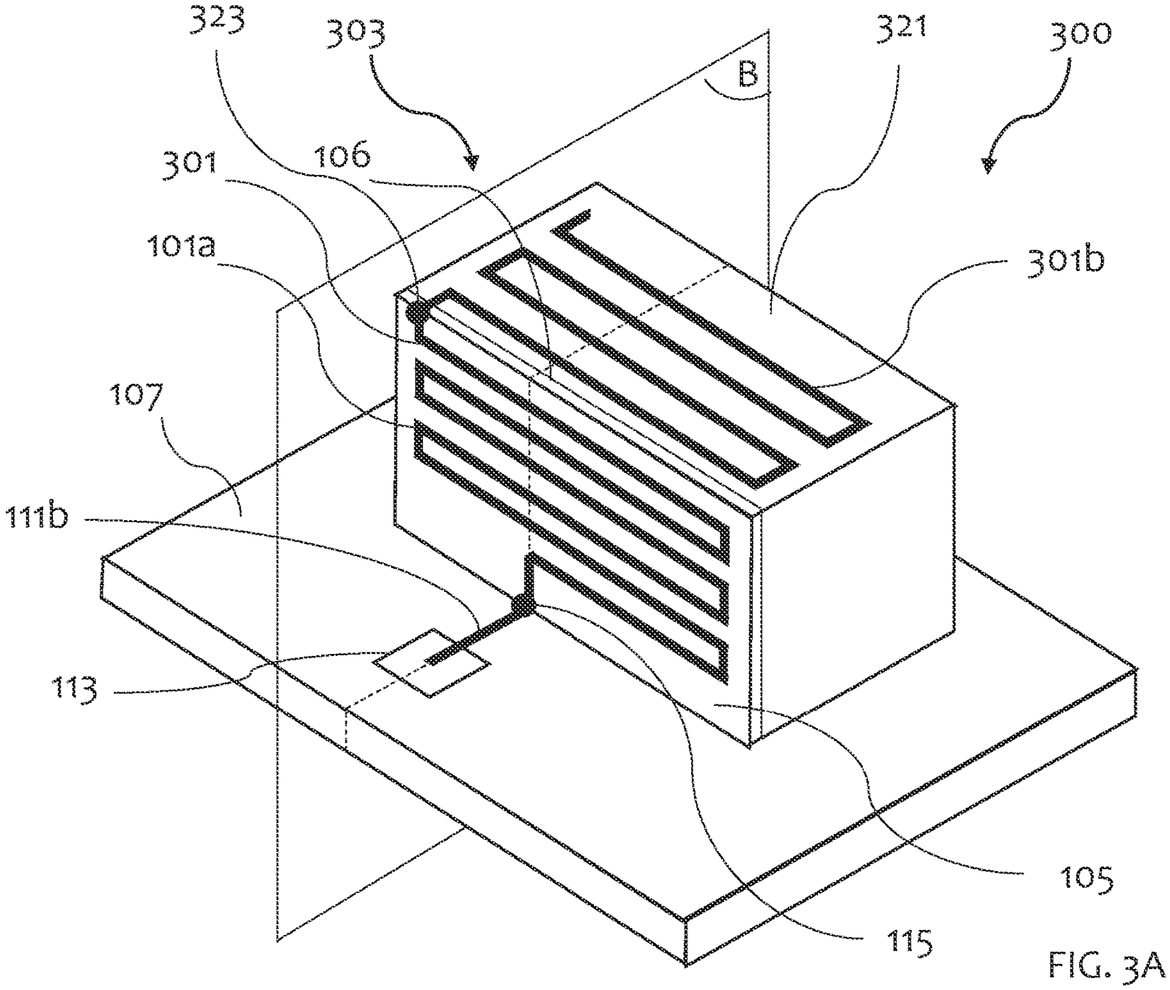
FIG. 3A and FIG. 3B respectively illustrate in a perspective view and a cross-section view, partial and simplified, an example of an electronic device comprising an antenna according to a second embodiment.
Figure 3B:
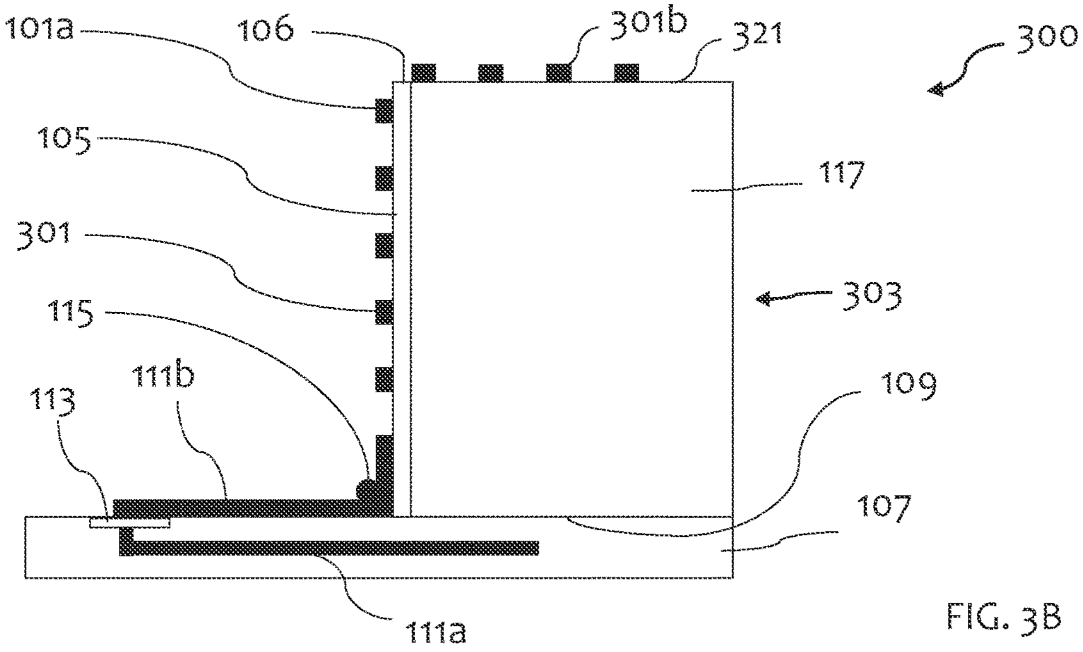

FIG. 3A and FIG. 3B respectively illustrate in a perspective view and a cross-section view, partial and simplified, an example of an electronic device 300 comprising an antenna 301 according to a second embodiment, FIG. 3B being a cross-section view along cross-section plane B of FIG. 3A.

The device 300 of FIGS. 3A and 3B comprises elements common with the device 100 of FIGS. 1A and 1B. These elements will not be detailed again hereafter. The device 300 of FIGS. 3A and 3B differs from the device 100 of FIGS. 1A and 1B essentially in that, in device 300, the antenna chip 103 of device 100 is replaced with an antenna chip 303. Chip 303 comprises the same elements as the chip 103 of device 100, arranged substantially in the same manner. Chip 303 differs from chip 103 in that it further comprises a second antenna element 301*b* on another surface of chip 303. As an example, chip 303 comprises an antenna 301 formed by the association of the first 101*a* and second 301*b* antenna elements. In FIGS. 3A and 3B, second antenna element 301*b* is formed on a surface 321 corresponding to the upper surface of chip 303 in the orientation of FIGS. 3A and 3B or, in other words, to the surface of chip 303 opposite to surface 109.

Second antenna element 301*b* is, for example, formed on top of and in contact with chip 303. Second antenna element 301*b* is connected, for example coupled, to first antenna element 101*a* by a solder joint 323.

Second antenna element 301*b* is, for example, made of the same material as first antenna element 101*a*. As an example, second antenna element 301*b* has the same shape and the same size as first antenna element 101*a*. In other words, the first 101*a* and second 301*b* antenna elements comprise conductive lines of same length, of same width, and having a similar spacing between two successive lines. Second antenna element 301*b* is, for example, formed after the step of transfer of chip 303 onto transfer substrate 107. As an example, second antenna element 301*b* is formed by local deposition of a conductive material, for example, a conductive ink, on the upper surface of substrate 117, possibly followed by a sintering. The local deposition is, for example, implemented by inkjet printing, or by any other suitable method of local deposition of a conductive material on a substrate.

As an example, solder joint 323 is deposited at the end of the step of forming of second antenna element 301*b*. As an example, solder joint 323 is similar to solder joint 115 by its composition, its size, and its deposition method. As an example, solder joints 115 and 323 are deposited within a single step.

Figure 4A:
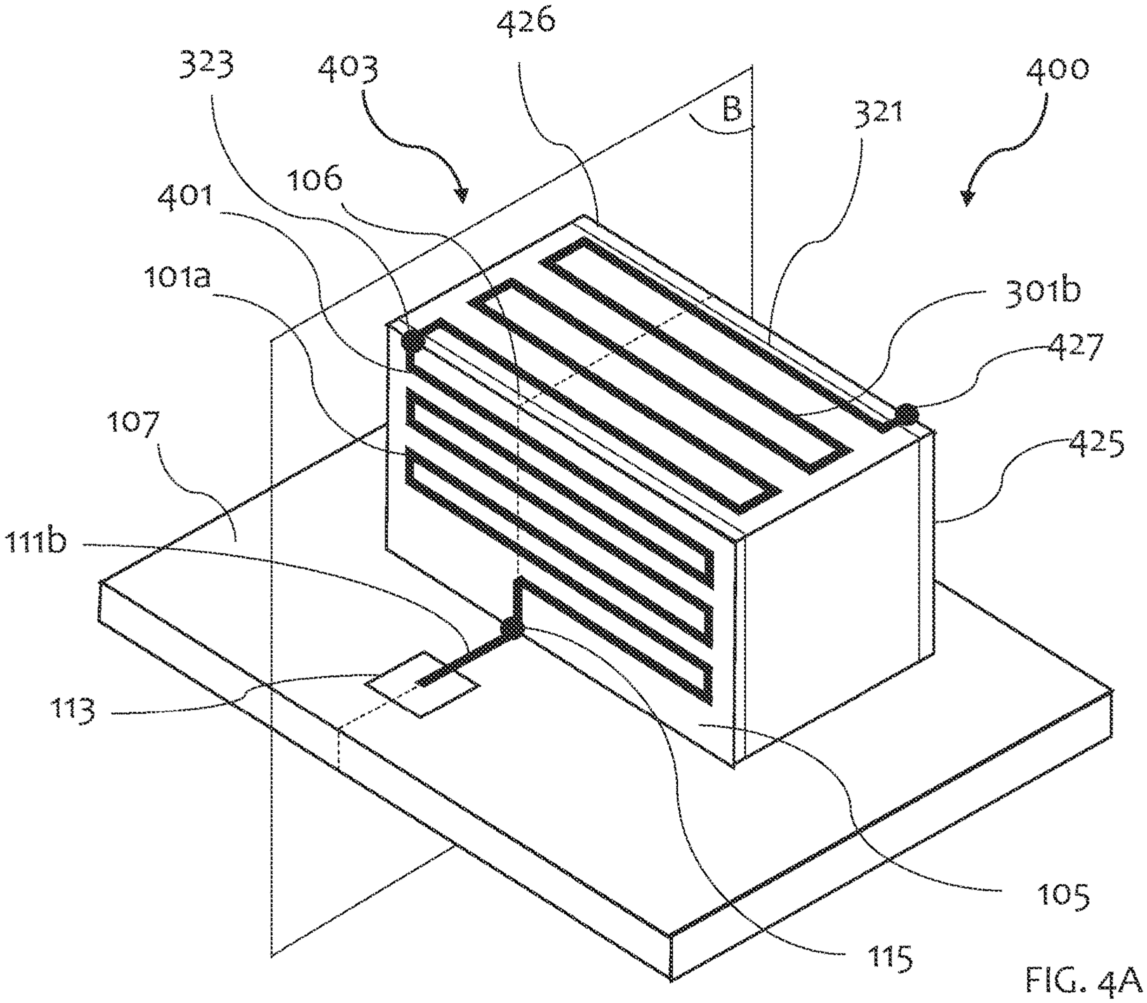
FIG. 4A and FIG. 4B respectively illustrate in a perspective view and a cross-section view, partial and simplified, an example of an electronic device comprising an antenna according to a third embodiment.
Figure 4B:
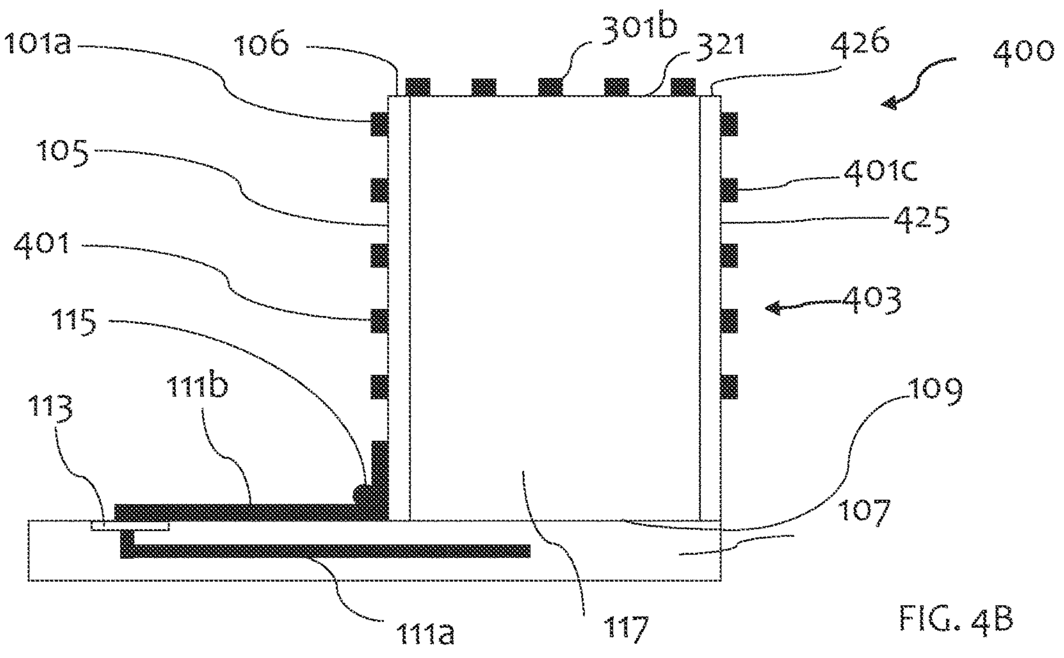

FIG. 4A and FIG. 4B respectively illustrate in a perspective view and a cross-section view, partial and simplified, an example of an electronic device 400 comprising an antenna 401 according to a third embodiment, FIG. 4B being a cross-section view along the cross-section plane B of FIG. 4A.

The device 400 of FIGS. 4A and 4B comprises elements common with the device 300 of FIGS. 3A and 3B. These elements will not be detailed again hereafter. The device 400 of FIGS. 4A and 4B differs from the device 300 of FIGS. 3A and 3B essentially in that, in device 400, the antenna chip 303 of device 300 is replaced with an antenna chip 403. Chip 403 comprises the same elements as the chip 303 of device 300, arranged substantially in the same manner. Chip 403 differs from chip 303 in that it further comprises a third antenna element 401*c* on a surface of chip 403. Third antenna element 401*c* is, for example, formed on a surface 425 corresponding to the lateral surface of chip 403, opposite to surface 105. As an example, chip 403 comprises an antenna 401 formed by the association of the first 101*a*, second 301*b*, and third 401*c* antenna elements.

The third antenna element 401*c* is, for example, formed on top of and in contact with a protection layer 426, located at the level of the surface 425 of chip 403. More precisely, antenna element 401*c* is, for example, formed on top of and in contact with the surface of protection layer 426 opposite to the chip substrate. Protection layer 426 is, for example, similar to the protection layer 106 located at the level of surface 105 of chip 403. If protection layer 426 is omitted, third antenna element 401*c* is, for example, formed on top of and in contact with the substrate of chip 403. Third antenna element 401*c* is connected, for example, coupled, to the second antenna element 301*b* formed on surface 321 of chip 403 for example by a solder joint 427.

Third antenna element 401*c* is, for example, made of the same material as the first 101*a* and second 301*b* antenna elements and is, for example, of same size as the latter. In other words, the first 101*a*, second 301*b*, and third 401*c* antenna elements comprise conductive lines of same length, of same width, and having a similar spacing between two successive lines.

As an example, solder joint 427 is similar to solder joints 115 and 323 by its composition and its size.

Figure 5A:
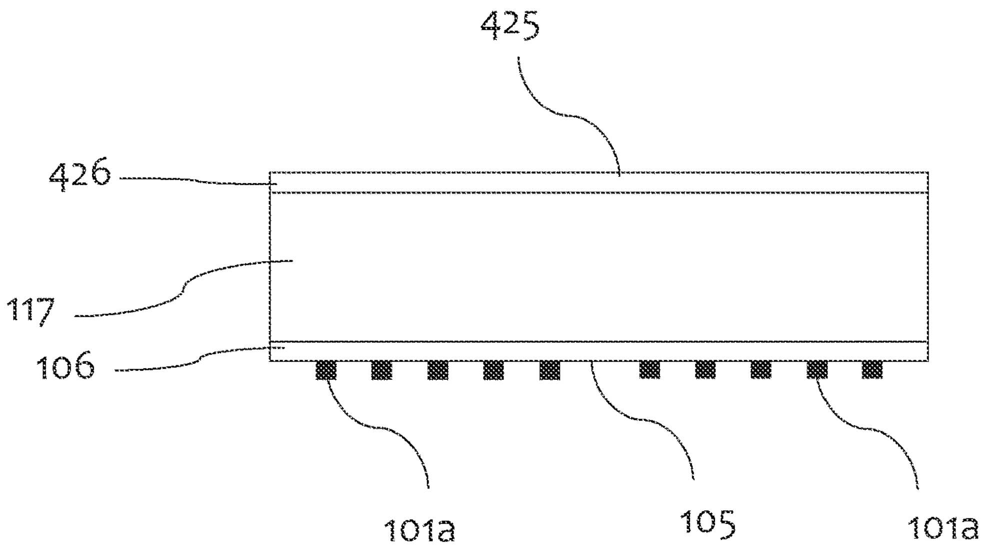
FIG. 5A, FIG. 5B, and FIG. 5C are cross-section views partially and schematically illustrating successive steps of an example of a method of manufacturing the device illustrated in FIGS. 4A and 4B according to an embodiment.
Figure 5B:
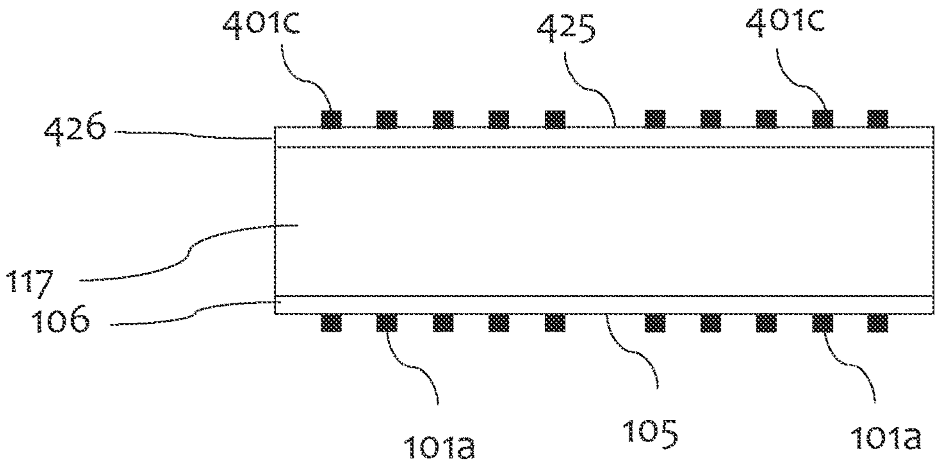
Figure 5C:
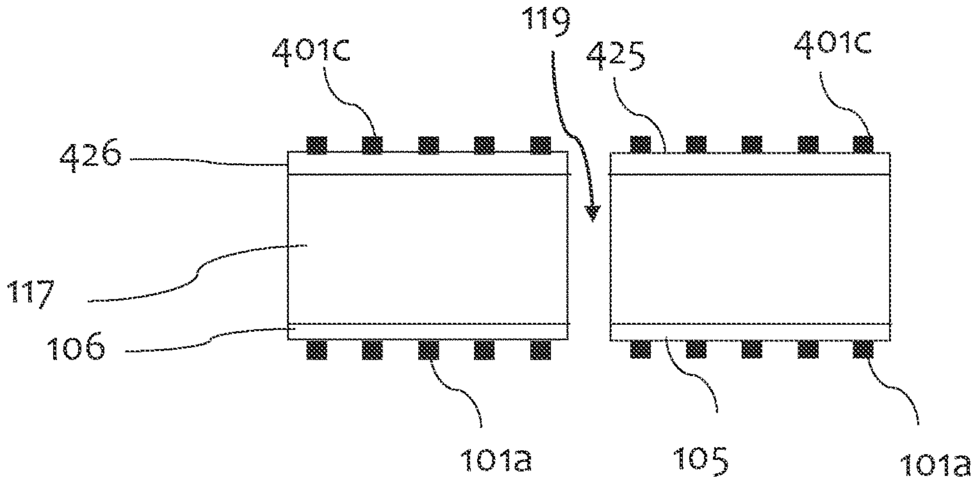

FIG. 5A, FIG. 5B, and FIG. 5C are cross-section views partially and schematically illustrating successive steps of an example of a method of manufacturing the device 400 illustrated in FIGS. 4*a* and 4B according to an embodiment.

Device 400 is manufactured from a structure illustrated in FIG. 5A similar to the structure illustrated in FIG. 2A, the structure illustrated in FIG. 5A comprising substrate 117 coated on a surface 105 with a protection layer 106 and with first antenna elements 101*a* formed on surface 105.

The method of manufacturing device 400 illustrated in FIGS. 4A and 4B is similar to the method of manufacturing device 100 illustrated in FIGS. 2A and 2B, with the difference that it comprises steps of forming of antenna elements 301*b*.

Based on the structure illustrated in FIG. 2A, protection layer 426 is deposited on a surface of substrate 117, corresponding, at the end of the method of manufacturing device 400, to surface 425 of chip 403. As an example, layer 426 is deposited before the forming of first antenna elements 101*a* on layer 106. At the end of the forming of protection layers 106 and 426 and of the forming of first antenna elements 101*a*, the structure corresponds to that shown in FIG. 5A, the structure of FIG. 5A being flipped with respect to the structure of FIG. 2A.

FIG. 5B illustrates a structure obtained at the end of a step of forming of a plurality of third antenna elements 401*c* on the surface 425 of the structure illustrated in FIG. 5A and more precisely on the upper surface of protection layer 426.

As an example, third antenna elements 491*c* are formed by a forming method similar to the method of forming of first antenna elements 101*a*.

FIG. 5C shows a structure obtained at the end of a step of dicing of the structure illustrated in FIG. 5B to form individual chips 403. During this dicing step, trenches 119 are formed in substrate 117 and, for example, through substrate 117 to entirely cross it. Trenches 119 are formed so that each chip 403 comprises at least one first antenna element 101*a* and at least one third antenna element 401*c*.

Trenches 119 cross, for example, protection layers 106 and 426 when they are present.

At the end of this step, although this is not shown in FIGS. 5A to 5C, chips 403 are transferred onto the upper surface of transfer substrate 107. As an example, each chip 403 is bonded to a transfer substrate 107 via an adhesive film, glue, or a solder material. There then follows, in successive steps, the forming of second conductive track 111*b*, the forming of second antenna element 301*b*, and the forming of solder joints 115, 323, and 427. As an example, solder joints 115, 323 and 427 are formed within a single step.

Figure 6A:
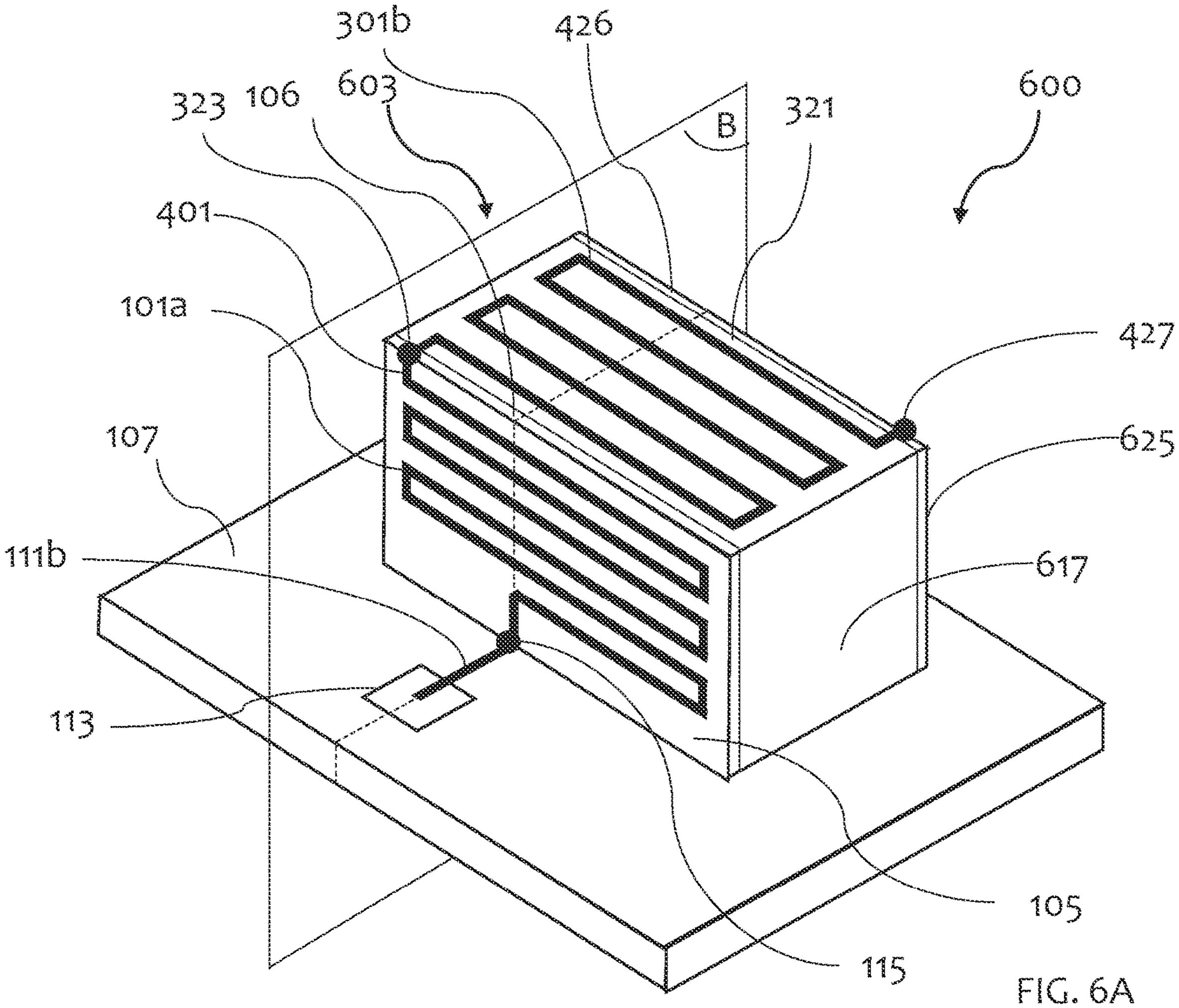
FIG. 6A and FIG. 6B respectively illustrate in a perspective view and a cross-section view, partial and simplified, an example of an electronic device comprising an antenna according to a fourth embodiment.
Figure 6B:
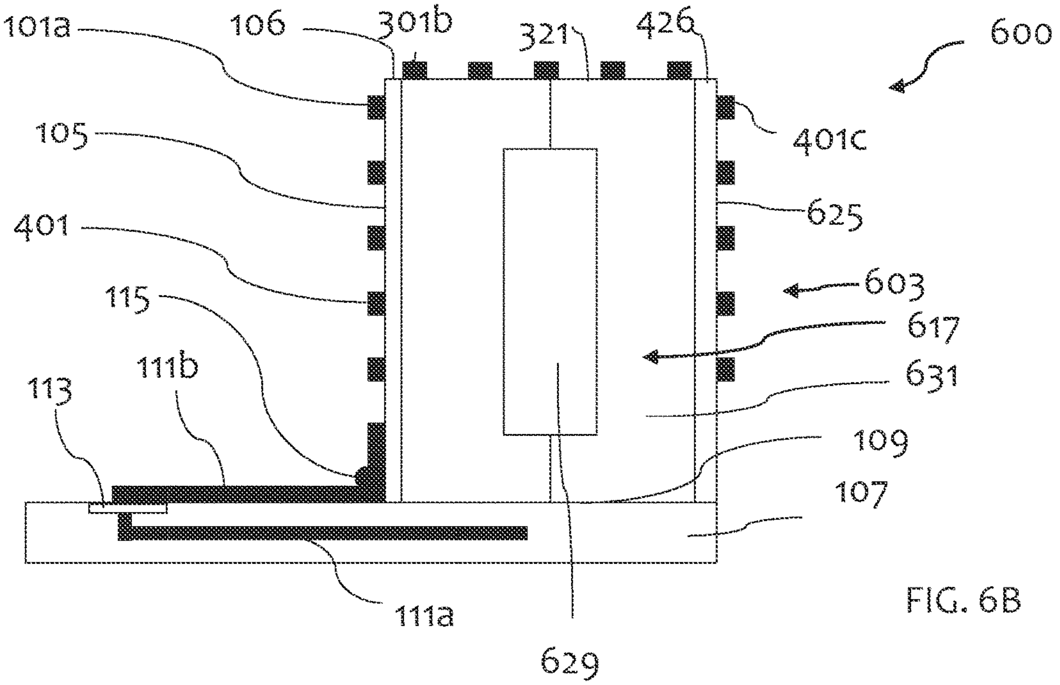

FIG. 6A and FIG. 6B respectively illustrate in a perspective view and in a cross-section view, partial and simplified, an example of an electronic device 600 comprising antenna 401 according to a fourth embodiment, FIG. 6B being a cross-section view along cross-section plane B of FIG. 6A.

The device 600 of FIGS. 6A and 6B comprises elements common with the device 400 of FIGS. 4A and 4B. These elements will not be detailed again hereafter. The device 600 of FIGS. 6A and 6B differs from the device 400 of FIGS. 4A and 4B essentially in that, in device 600, the antenna chip 403 of device 400 is replaced with an antenna chip 603. Chip 603 comprises the same elements as the chip 403 of device 400, arranged substantially in the same manner. Chip 603 differs from chip 403 in that substrate 117 is replaced with a substrate 617 formed by an assembly of two substrates 631 placed against each other (back-to-back facing), the assembly of the two substrates 631 forming, inside of chip 603, a cavity 629, for example, a tight cavity, filled with a gas or partial vacuum.

Substrates 631 are, for example, made of a semiconductor material such as silicon. As a variant, substrates 631 are made of glass.

An advantage of the introduction of a gas or of vacuum at the center of chip 603 and more particularly between two antenna elements is that this enables to limit interferences or crosstalk between the waves captured by first antenna element 101*a* and the waves captured by third antenna element 401*c*.

FIG. 7A, FIG. 7B, FIG. 7C, FIG. 7D, and FIG. 7E are cross-section views, partially and schematically illustrating successive steps of an example of a method of manufacturing the device illustrated in FIGS. 6A and 6B according to an embodiment.

Figure 7A:
FIG. 7A, FIG. 7B, FIG. 7C, FIG. 7D, and FIG. 7E are cross-section views, partially and schematically illustrating successive steps of an example of a method of manufacturing the device illustrated in FIGS. 6A and 6B according to an embodiment.

FIG. 7A shows a structure comprising a substrate 631 on which a protection layer 635 has been formed.

Protection layer 635 corresponds, at the end of the method of manufacturing device 600, to protection layer 106 or to protection layer 426. Layer 635 is thus of same nature as layers 106 and 426.

Figure 7B:
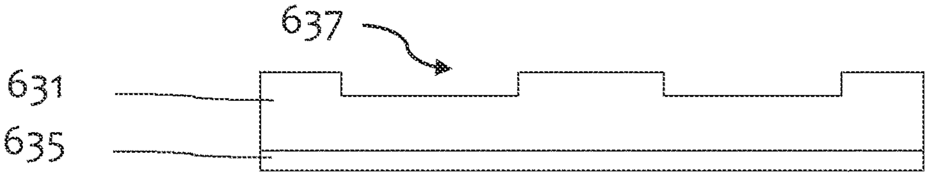

FIG. 7B illustrates the structure obtained at the end of a step of forming of non-through recesses 637 in the structure illustrated in FIG. 7A. As an example, a portion of the thickness of substrate 631 is locally removed by etching, to form recesses 637. Recesses 637 are formed from a second surface of substrate 631, for example, opposite to the first surface. In other words, recesses 637 are formed from the surface opposite to layer 635.

Figure 7C:
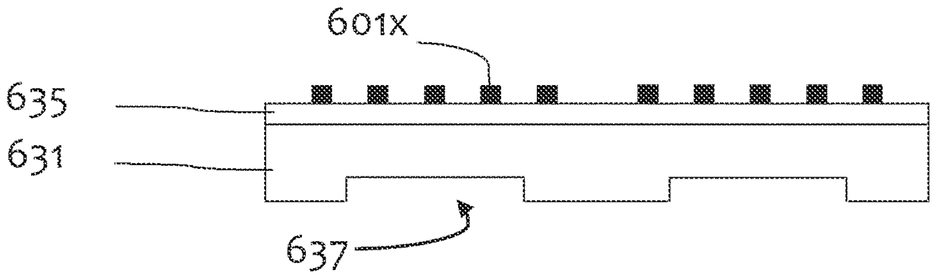

FIG. 7C illustrates the structure obtained at the end of a step of forming of antenna element 601*x* on top of and in contact with the protection layer 635 coating substrate 631. As a variant, when protection layer 106 is omitted, antenna elements 601*x* are formed in contact with substrate 631. Antenna elements 601*x* correspond, at the end of the method of manufacturing of device 600, to first antenna element

101*a* or to third antenna elements 401*c*. As an example, antenna elements 601*x* are aligned with recesses 637.

Figure 7D:
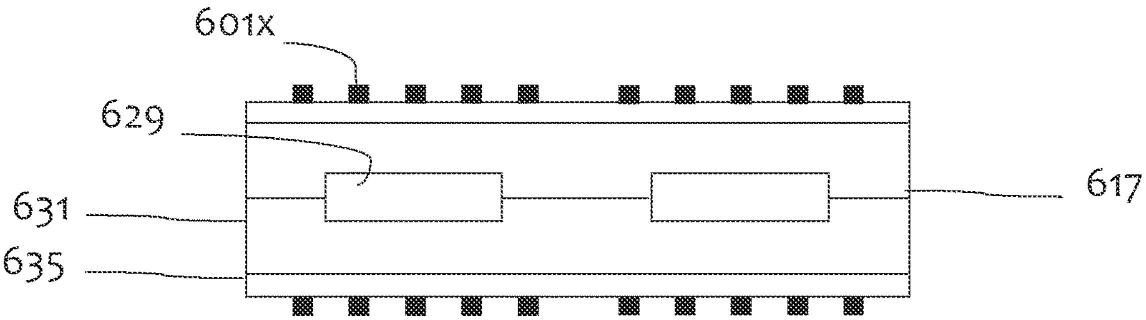

FIG. 7D corresponds to the structure obtained at the end of a step of bonding of two structures such as illustrated in FIG. 7C to each other, by their surface comprising recesses 637, by aligning the recesses 637 of the two structures to define cavities 629, the two substrates 631 forming substrate 617. The bonding of the two structures may be obtained by direct bonding or molecular bonding of the surface of the substrate 631 of the first structure opposite to antenna elements 601*x* to the surface of the substrate 631 of the second structure opposite to antenna elements 601*x*. As a variant, an intermediate bonding material may be provided between the substrates 631 of the two structures, at the periphery of cavities 629.

As a variant, antenna elements 601*x* are formed after the step of bonding of the two substrates 631 to each other.

Figure 7E:
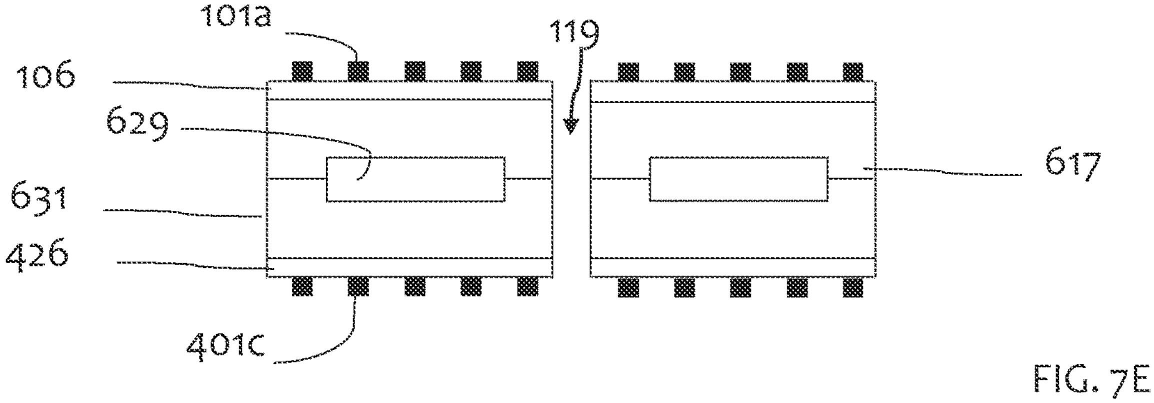

FIG. 7E corresponds to the structure obtained at the end of a step of dicing of the structure illustrated in FIG. 7D to form individual chips 603. During this dicing step, similarly to what has been described in relation with FIG. 2B, trenches 119 are formed in substrate 617 and, for example through substrate 617. Trenches 119 are formed so that each chip 603 comprises at least one first antenna element 101*a*, at least one third antenna element 491*c*, and a cavity 629.

As an example, the trenches 119 of the structure illustrated in FIG. 7E are similar to the trenches 119 of the structure illustrated in FIG. 2B. Trenches 119 cross, for example, protection layers 106 and 426 when they are present.

At the end of this step, although this is not shown in FIGS. 7A to 7E, similarly to what has been described in relation with FIG. 2B, the method comprises a step of transfer of chips 603 onto the upper surface of transfer substrate 107, a step of forming of second conductive track 111*b*, a step of forming of second antenna 301*b*, and a step of forming of solder joints 115, 323, and 427.

An advantage of the described method is that it enables to maximize the size of the antenna with respect to the size of the chip and to capture electromagnetic waves in all directions. This in particular enables to increase the performance of the antenna.

An advantage of the described method is that it may easily adapt to many types of antennas, for example, to Bluetooth antennas, to 3G, 4G, or 5G antennas.

Various embodiments and variants have been described. Those skilled in the art will understand that certain features of these various embodiments and variants may be combined, and other variants will occur to those skilled in the art. In particular, the embodiment of FIGS. 6A, 6B may be combined with the embodiment of FIGS. 3A and 3B.

Further, the described embodiments are not limited to the examples of materials and of dimensions mentioned in the present disclosure.

Finally, the practical implementation of the described embodiments and variations is within the abilities of those skilled in the art based on the functional indications given hereabove.

The invention claimed is:

1. A method of manufacturing an electronic device, comprising the following successive steps:

a) forming a plurality of first antenna elements on a first surface of a first substrate;

b) dicing the first substrate to form a plurality of antenna chips, wherein each antenna chip comprises, on a first surface corresponding to said first surface of the first substrate, one of said first antenna elements; and c) bonding a second surface of one of said antenna chips onto a transfer substrate, wherein said second surface of the antenna chip is orthogonal to the first surface of the antenna chip.

2. The method according to claim 1, wherein the transfer substrate includes a first metal track inside and/or on top of the transfer substrate, the method further comprising, after step c), forming a second conductive track on the transfer substrate between the first antenna element and the first metal track, said second conductive track providing an electrical connection between the first antenna element and the first metal track.

3. The method according to claim 2, further comprising a step of providing a first solder joint between the first antenna element and the second conductive track.

4. The method according to claim 1, wherein forming the plurality of first antenna elements comprises:

depositing an electrically-conductive material over the first surface of the first substrate; and then locally removing said electrically-conductive material to define the first antenna elements.

5. The method according to claim 1, wherein forming the plurality of first antenna elements comprises locally depositing an electrically-conductive material on the first surface of the first substrate.

6. The method according to claim 5, wherein the electrically-conductive material is a conductive ink.

7. The method according to claim 1, further comprising, after step b), forming a second antenna element on a third surface of the antenna chip, wherein the third surface is opposite to the second surface.

8. The method according to claim 7, wherein forming the second antenna element comprises locally depositing an electrically-conductive material onto the third surface of the antenna chip.

9. The method according to claim 8, wherein the electrically-conductive material is a conductive ink.

10. The method according claim 7, further comprising providing a second solder joint between the second antenna element and the first antenna element.

11. The method according to claim 1, further comprising, between steps a) and b):

flipping the first substrate; and forming a plurality of third antenna elements on a fourth surface of the first substrate, wherein the fourth surface is opposite to the first surface.

12. The method according to claim 1, wherein the first substrate is made of a semiconductor material.

13. The method according to claim 1, wherein the first substrate is made of glass.

14. The method according to claim 1, wherein the antenna chip comprises an internal empty or gas-filled cavity.

15. The method according to claim 14, wherein the antenna chip comprises two diced first substrates placed in a back-to-back relationship against each other, and where at least one of the two diced first substrates comprises a recess below a corresponding first antenna element, said recess defining at least in part said internal empty or gas-filled cavity.

16. The method according to claim 14, further comprising, after step a), forming a plurality of recesses in a second surface of the first substrate, said second surface being opposite the first surface of the first substrate, each recess formed below a corresponding one of said first antenna elements.

17. The method according to claim 16, wherein the antenna chip comprises two first substrates placed in a back-to-back relationship against each other with their respective recesses aligned with each other.

18. The method according to claim 1, further comprising coating the first substrate, during a step preceding step a), with a protection layer located at an interface with the first antenna elements.

19. The method according to claim 1, wherein the transfer substrate includes a metal track on top of the transfer substrate, the method further comprising providing an electrical connection between the first antenna element and the metal track.

20. The method according to claim 19, further comprising a step of forming a first solder joint between the first antenna element and the second conductive track.

21. A method of manufacturing an electronic device, comprising the following successive steps:

a) forming a plurality of first antenna elements on a first surface of a first substrate;

b) forming a plurality of second antenna elements on a first surface of a second substrate;

c) mounting a second surface of the first substrate that is opposite the first surface of the first substrate to a second surface of the second substrate that is opposite the first surface of the second substrate;

d) dicing an assembly of the first and second substrates mounted together to form a plurality of antenna chips, wherein each antenna chip comprises, on a first face corresponding to said first surface of the first substrate, one of said first antenna elements and on a second face corresponding to said first surface of the second substrate, one of said second antenna elements; and e) bonding a third face of one of said antenna chips onto a transfer substrate, wherein the third face of the antenna chip is orthogonal to each of the first and second faces of the antenna chip.

22. The method according to claim 21, wherein mounting comprises molecular bonding.

23. The method according to claim 21, further comprising, prior to step c), forming a plurality of recesses in the second surface of the first substrate, each recess formed below a corresponding one of said first antenna elements, and wherein each antenna chip comprises an internal empty or gas-filled cavity defined at least in part by one of the recesses.

24. The method according to claim 21, wherein the transfer substrate includes a metal track on top of the transfer substrate, the method further comprising providing an electrical connection between the first antenna element and the metal track.

25. The method according to claim 24, further comprising forming a first solder joint between the first antenna element and the second conductive track.

26. The method according to claim 21, wherein the first substrate is made of a semiconductor material.

27. The method according to claim 21, wherein the first substrate is made of glass.

* * * * *